United States Patent
Danby et al.

(10) Patent No.: US 8,322,132 B2
(45) Date of Patent: Dec. 4, 2012

(54) EXHAUST TREATMENT SYSTEM IMPLEMENTING REGENERATION CONTROL

(75) Inventors: Susannah E. Danby, Petersborough (GB); David Mark Heaton, Yarwell (GB); Stephen Anthony Faulkner, Carlby (GB); Robert Southall, Eaton Ford (GB)

(73) Assignee: Perkins Engines Company Limited, Peterborough (GB)

( * ) Notice: Subject to any disclaimer, the term of this patent is extended or adjusted under 35 U.S.C. 154(b) by 1135 days.

(21) Appl. No.: 12/149,344

(22) Filed: Apr. 30, 2008

(65) Prior Publication Data

US 2009/0272103 A1 Nov. 5, 2009

(51) Int. Cl.
*F01N 3/00* (2006.01)

(52) U.S. Cl. ........... 60/295; 60/274; 60/286; 60/297; 60/300; 60/303; 60/311

(58) Field of Classification Search .......... 60/274, 60/286, 295, 297, 300, 303, 311
See application file for complete search history.

(56) References Cited

U.S. PATENT DOCUMENTS

| | | | |
|---|---|---|---|
| 4,571,938 A | 2/1986 | Sakurai | |
| 5,094,075 A | 3/1992 | Berendes | |
| 5,211,009 A | 5/1993 | Houben et al. | |
| 5,711,149 A * | 1/1998 | Araki | 60/278 |
| 5,826,428 A | 10/1998 | Blaschke | |
| 5,829,248 A | 11/1998 | Clifton | |
| 6,725,653 B2 | 4/2004 | Brown et al. | |
| 6,735,941 B2 | 5/2004 | Saito et al. | |
| 6,978,602 B2 * | 12/2005 | Ohtake et al. | 60/295 |
| 7,063,072 B2 | 6/2006 | Persson et al. | |
| 7,104,050 B2 * | 9/2006 | Sato et al. | 60/295 |
| 7,159,391 B2 * | 1/2007 | Kogo et al. | 60/297 |
| 7,231,291 B2 | 6/2007 | Dollmeyer et al. | |
| 7,249,455 B2 | 7/2007 | Tumati et al. | |
| 7,263,825 B1 | 9/2007 | Wills et al. | |
| 7,404,933 B2 * | 7/2008 | Twigg | 422/177 |
| 2005/0000209 A1 | 1/2005 | Takahashi et al. | |
| 2005/0150221 A1 | 7/2005 | Crawley et al. | |
| 2005/0252198 A1 | 11/2005 | Okugawa et al. | |
| 2005/0284138 A1 | 12/2005 | Imai et al. | |

(Continued)

FOREIGN PATENT DOCUMENTS

DE 4243035 * 6/1994

(Continued)

*Primary Examiner* — Binh Q Tran
*Assistant Examiner* — Diem Tran
(74) *Attorney, Agent, or Firm* — Finnegan, Henderson, Farabow, Garrett & Dunner LLP

(57) ABSTRACT

An exhaust treatment system associated with a power source is disclosed. The exhaust treatment system may have a filter located to remove particulate matter from an exhaust flow of the power source. The exhaust treatment system may further have a heat source located to elevate the temperature of the exhaust flow. The exhaust treatment system may also have a first sensor and a second sensor. The exhaust treatment system may further have a controller in communication with the heat source, the first sensor, and the second sensor. The controller may be configured to receive a particulate matter load value and a power source load value and activate the heat source when the particulate matter load value is above a particulate matter load threshold value and the power source load value is below a power source load threshold value that is indicative of the exhaust flow being within an exhaust flow range.

19 Claims, 2 Drawing Sheets

U.S. PATENT DOCUMENTS

| | | | |
|---|---|---|---|
| 2006/0266022 A1 | 11/2006 | Woerner et al. | |
| 2007/0193258 A1* | 8/2007 | Berke | 60/297 |
| 2007/0271906 A1 | 11/2007 | Berke et al. | |
| 2007/0289292 A1 | 12/2007 | Cook et al. | |
| 2010/0043403 A1* | 2/2010 | Minamikawa et al. | 60/285 |

FOREIGN PATENT DOCUMENTS

| | | | |
|---|---|---|---|
| DE | 102005052990 | | 5/2006 |
| EP | 1455070 | | 9/2004 |
| EP | 1584807 | | 10/2005 |
| EP | 1801370 | | 6/2007 |
| GB | 2184669 | * | 7/1987 |
| WO | 2004015248 | | 2/2004 |

* cited by examiner

EXHAUST TREATMENT SYSTEM IMPLEMENTING REGENERATION CONTROL

TECHNICAL FIELD

The present disclosure relates generally to an exhaust treatment system and, more particularly, to an exhaust treatment system that implements regeneration control.

BACKGROUND

Engines, including diesel engines, gasoline engines, natural gas engines, and other engines known in the art, exhaust a complex mixture of air pollutants. The air pollutants may be composed of gaseous and solid material, which can include particulate matter. Due to increased attention on the environment, exhaust emission standards have become more stringent and the amount of particulate matter emitted from an engine may be regulated depending on the type of engine, size of engine, and/or class of engine.

A method used by engine manufacturers to reduce the amount of particulate matter emitted to the environment includes removing the particulate matter from the exhaust flow of an engine with a device called a particulate filter. A particulate filter is designed to trap particulate matter and typically consists of a wire mesh or ceramic honeycomb filtration medium. Although efficient at removing particulate matter from an exhaust flow, the use of the particulate filter for extended periods of time can cause the particulate matter to build up in the filtration medium, thereby reducing the functionality of the filter and subsequent engine performance. The collected particulate matter can be removed from the filtration medium through a process called regeneration. To initiate regeneration of the filtration medium, the temperature of the particulate matter entrained within the filtration medium is elevated to a combustion threshold, at which the particulate matter is burned away in the presence of oxygen or $NO_2$.

Regeneration of a filtration medium may be implemented passively, relying on heat contained with the exhaust flow that was generated solely during engine combustion. Alternatively, regeneration of a particulate filter may be implemented actively, relying upon an auxiliary heat source, such as a fuel-fired burner, to elevate the temperature of the exhaust flow to a temperature capable of combusting particulate matter. Regeneration strategies that rely solely on passive regeneration may be ineffective at maintaining sufficient temperatures to ensure regeneration. Whereas, regeneration strategies based solely on active regeneration may inefficiently heat particulate matter when regeneration of the particulate filter is not necessary, thereby increasing the cost and complexity of the regeneration system.

One example of an exhaust emission control device implementing passive and active regeneration strategies is described in U.S. Pat. No. 6,725,653 (the '653 patent) to Brown et al. The '653 patent discloses a system including an engine emitting exhaust into a particulate filter. The '653 patent also includes a controller to regulate operation of a heat source. The controller receives data from a temperature sensor and a pressure sensor to determine when the amount of particulate matter within the filter exceeds a threshold amount. When the amount of detected particulate matter exceeds the threshold amount or after a defined period of time, the controller signals the heat source to operate in an active regeneration mode. The heat source operates in either a full or partial exhaust flow via a bypass value to vary the amount of exhaust flow allowed to pass through the heat source. The bypass valve can preserve fuel supplied to the heat source by limiting the amount of exhaust flow that is heated.

Although prior art systems may alleviate some of the problems associated with filter regeneration, there is a need for a more efficient and less complex filter regeneration system. The prior art systems incorporate complex components and complex control that increase system cost and maintenance. The disclosed exhaust treatment system is directed to overcoming problems associated with the prior art systems.

SUMMARY

In one aspect, the present disclosure is directed to an exhaust treatment system associated with a power source. The exhaust treatment system may include a filter located to remove particulate matter from an exhaust flow of the power source. The exhaust treatment system may further include a heat source located to elevate the temperature of the exhaust flow. The exhaust treatment system may also include a first sensor configured to sense a particulate matter load value associated with the filter. The exhaust treatment system may additionally include a second sensor configured to sense a power source load value. The exhaust treatment system may further include a controller in communication with the heat source, the first sensor, and the second sensor. The controller may be configured to receive the particulate matter load value. The controller may be further configured to receive the power source load value. The controller may additionally be configured to activate the heat source when the particulate matter load value is above a particulate matter load threshold value and the power source load value is below a power source load threshold value that is indicative of the exhaust flow being within an exhaust flow range.

In another aspect, the present disclosure is directed to a method of operating a power source. The method may include combusting an air and fuel mixture to generate power and an exhaust flow. The method may further include collecting particulate matter from the exhaust flow. The method may also include sensing a particulate matter load value indicative of an amount of collected particulate matter. The method may additionally include sensing a power source load value. The method may further include heating the exhaust flow to burn away the collected particulate matter when the particulate matter load value exceeds a particulate matter load threshold value and the power source load value is below a power source load threshold value that is indicative of the exhaust flow being within an exhaust flow range.

DETAILED DESCRIPTION

Figure 1:
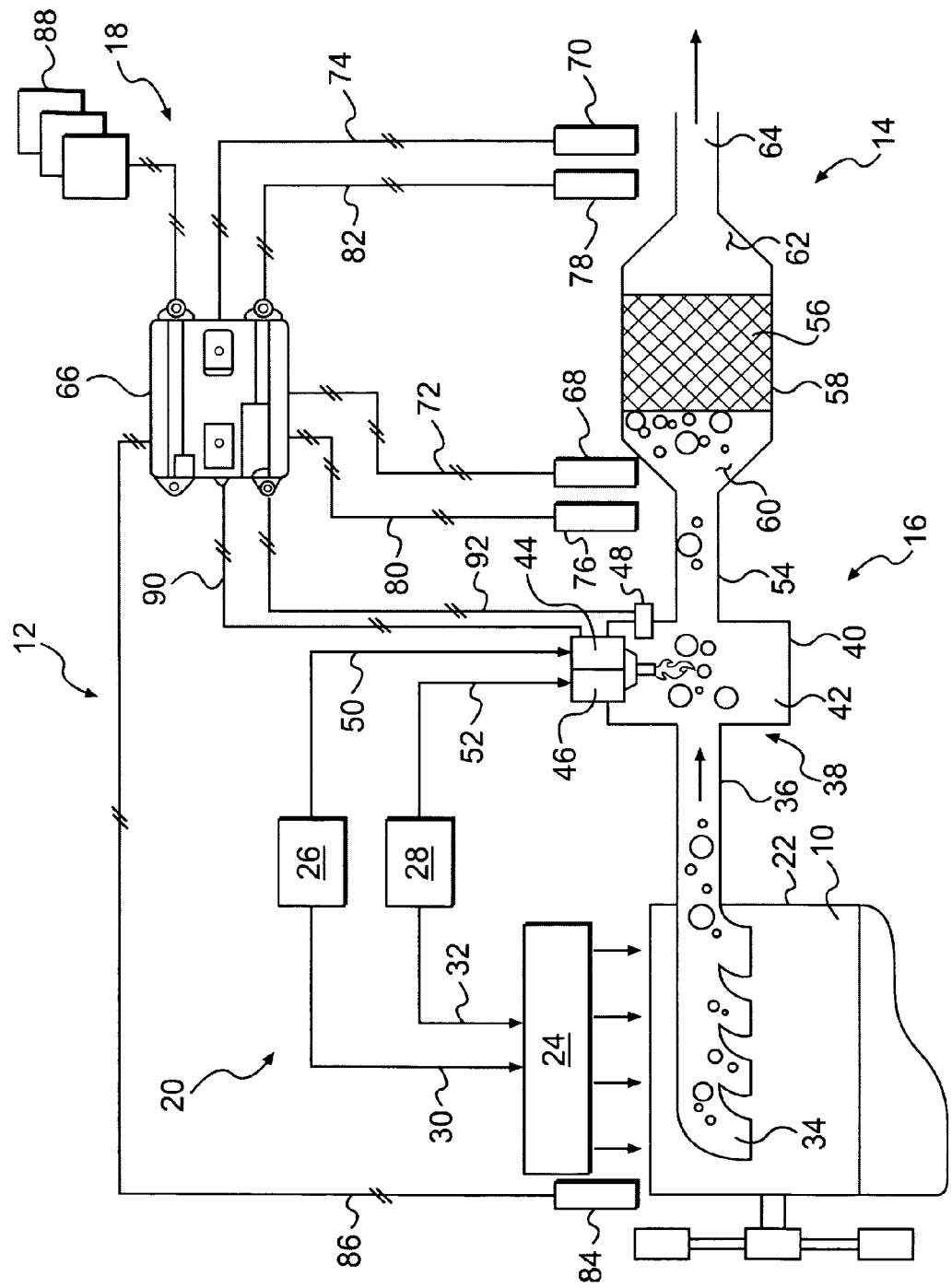
FIG. 1 is a schematic illustration of a power source including an exemplary disclosed heat treatment system.

FIG. 1 illustrates a power source 10. Power source 10 may embody an engine such as, for example, a diesel engine, a gasoline engine, a gaseous fuel-powered engine such as a natural gas engine, or any other engine apparent to one skilled in the art. Power source 10 may alternatively embody a non-engine source of power such as a furnace. Power source 10 may include an engine block 22 that at least partially defines a plurality of cylinders (not shown), a piston (not shown) slidably disposed within each cylinder, and a cylinder head associated with each cylinder. The cylinder, piston, and cylinder head may form a combustion chamber (not shown). Power source 10 may draw an air/fuel mixture into each cylinder, compress the mixture with the piston, and ignite the mixture to produce a combination of power, heat, and exhaust.

Power source 10 may include an air/fuel intake system 20 configured to supply an air/fuel mixture to power source 10. Air/fuel intake system 20 may include an intake manifold 24 that receives fuel from a fuel supply 26 and air from an air supply 28. As an alternative to fuel flowing through intake manifold 24 before entering power source 10, fuel from fuel supply 26 may bypass intake manifold 24 and flow directly into power source 10 (not shown). Fuel supply 26 may include a fuel tank (not shown) for storing a supply of fuel. Power source 10 may receive fuel through intake manifold 24 via fuel supply line 30 from fuel supply 26. Fuel supply 26 may also include a fuel pump (not shown) and a fuel injection system (not shown) for pressurizing and imparting fuel into the combustion chamber. Air supply 28 may include a compressor (not shown) and/or a duct for providing a supply of pressurized air to intake manifold 24. Power source 10 may receive air through intake manifold 24 via air supply line 32 from air supply 28.

After combustion, an exhaust manifold 34 may be configured to direct exhaust generated from power source 10 through an exhaust circuit via exhaust conduit 36 to a regeneration system 16. Exhaust flow expelled from exhaust manifold 34 may have varying exhaust flow dynamics. Exhaust flow dynamics may be defined by characteristics including flow velocity, pressure, temperature, and particulate matter quantity. Exhaust flow dynamics may also vary dependent on power source load. For example, during high power source loads, the exhaust flow may include flow characteristics including high velocity, high pressure, high temperature, and large amounts of particulate matter. In contrast, during low power source loads, the exhaust flow may include flow characteristics including lower velocity, lower pressure, lower temperature, and/or smaller amounts of particulate matter.

Regeneration system 16 may include a heat source, for example, a fuel-fired burner 38. Burner 38 may be configured to thermally regenerate exhaust treatment system 12 by increasing the temperature of the exhaust flow. Burner 38 may be located between exhaust manifold 34 and a particulate filter 14. In other words, burner 38 may be located downstream of exhaust manifold 34 and upstream of particulate filter 14. Burner 38 may include a burner housing 40 defining therein, a burner chamber 42. Burner 38 may also include a fuel injector 44 configured to inject fuel into the exhaust flow, an air valve 46 configured to mix pressurized air with the injected fuel, and an ignition source 48 configured to ignite the air/fuel mixture within burner chamber 42. Fuel injector 44 may receive fuel from fuel supply 26 via a fuel supply line 50. Air valve 46 may receive air from air supply 28 via an air supply line 52. Burner 38 may create a flame, which may be in heat exchange relationship with the exhaust flow. When burner 38 is activated to provide active regeneration of particulate filter 14, exhaust exiting burner 38 via exhaust conduit 54 may have an elevated temperature relative to the temperature of the same exhaust flow that entered burner 38 via exhaust conduit 36. Although only a fuel-fired burner 38 is discussed in detail, it is contemplated that other types of heat sources may be implemented, for example, an electrical heat source.

Current may be supplied to ignition source 48 to ignite the air/fuel mixture before or after the mixture is delivered to the exhaust flow. Ignition source 48 may include a spark plug, a heater, a glow plug, or any other sources for igniting an air/fuel mixture. Fuel injector 44, air valve 46, and ignition source 48 may be mounted or otherwise fixed to burner housing 40. It is also contemplated that fuel injector 44, air valve 46, and ignition source 48 may extend at least partially into burner chamber 42.

Particulate filter 14 may be situated downstream of exhaust conduit 54 to remove particulate matter from the exhaust flow. Particulate filter 14 may include a filter media 56 positioned within a filter housing 58. Filter housing 58 may include a filter inlet 60 in flow communication with exhaust conduit 54, and a filter outlet 62 in flow communication with an exhaust conduit 64. Exhaust flow may pass from exhaust conduit 64 to the atmosphere. It is contemplated that filter housing 58 may be removably positioned between exhaust conduits 54 and 64 such that particulate filter 14 may be serviced. Although burner 38 is shown upstream of particulate filter 14, it is contemplated that burner 38 may be formed integral with particulate filter 14. For example, burner 38 may be positioned within filter housing 58 (not shown). Additionally, filter particulate 14 may also include an oxidation catalyst (not shown), for example, upstream of filter media 56.

Particulate filter 14 may be any general type of exhaust filter known in the art and may include any type of filter media 56, such as, for example, a ceramic foam, solid ceramic, sintered metal, metal foam, solid silicon carbide, or silicon carbide foam. Filter media 56 may assist in removing particulate matter including soot, soluble organic fraction (SOF), and other pollutants produced by power source 10. Filter media 56 may be situated horizontally, vertically, radially, or in any other configuration allowing for proper filtration. Additionally, filter media 56 may be of a honeycomb, mesh, mat, or any other configuration that provides an appropriate surface area available for filtering of particulate matter. Furthermore, filter media 56 may contain pores, cavities, or spaces of a size that allow exhaust gas to flow through while substantially restricting the passage of particulate matter.

A control system 18 may regulate the operation of regeneration system 16. More specifically, control system 18 may regulate when regeneration system 16 is activated or deactivated and, when activated, control system 18 may regulate an air/fuel ratio of the air/fuel mixture combusted within burner chamber 42 based on various sensed characteristics of exhaust treatment system 12. For example, control system may activate regeneration system 16 when exhaust flow is within an exhaust flow range. For example, the exhaust flow range may be a narrow exhaust flow range defined by exhaust flow dynamic characteristics. Control system 18 may include a controller 66 in communication with one or more sensors for sensing exhaust flow dynamic characteristics. For example, control system 18 may include a particulate filter load sensing device including a first pressure sensor 68 and a second pressure sensor 70 in communication with controller 66 via communication lines 72 and 74, respectively. Control system 18 may also include a temperature sensing device including a first temperature sensor 76 and a second temperature sensor 78 in communication with controller 66 via communication lines 80 and 82, respectively. It is also contemplated that control system 18 may include a power source load sensor 84 in communication with controller 66 via a communication line 86.

First pressure sensor 68 may be positioned upstream of filter media 56, and second pressure sensor 70 may be positioned downstream of filter media 56. It is contemplated that first and second pressure sensors 68, 70 may be any type of sensor capable of detecting a quantity of particulate matter within particulate filter 14. For example, first and second pressure sensors 68, 70 may be capable of detecting a pressure difference across particulate filter 14, wherein the pressure difference may be indicative of the amount of particulate matter contained with filter media 56. It is contemplated that first and second pressure sensors 68, 70 may alternatively or additionally be any type of sensor capable of directly detecting the quantity of particulate matter within particulate filter 14. It is contemplated that the particulate matter load sensor may be a single sensor. As an alternative to pressure sensors 68, 70, a mass sensor (not shown) may be implemented to measure or infer the amount of particulate matter within particulate filter 14.

First temperature sensor 76 may be positioned upstream of filter media 56, and second temperature sensor 78 may be positioned downstream of filter media 56. First and second temperature sensors 76, 78 may be any type of sensor capable of detecting an exhaust flow temperature. For example, first and second temperature sensors 76, 78 may be thermocouples. While two temperature sensors are depicted, any number of temperature sensors may be implemented. For example, a single temperature sensor may be sufficient to detect exhaust flow temperature. Additionally, it is contemplated that more than two temperature sensors may be implemented to increase the accuracy of temperature sensing or to compare temperatures at various points along the exhaust flow path. Additional temperature sensors may be positioned at various points along the exhaust flow path, for example, immediately upstream and downstream of burner 38 (not shown). It is also contemplated that a temperature sensor may not be implemented and the particulate load sensor (e.g., first and second pressure sensors 68, 70) and power source load sensor 84 may be sufficient to determine when the exhaust flow is within a narrow exhaust flow range.

Power source load sensor 84 may be configured to sense a load of power source 10. For example, power source load sensor 84 may sense an idle condition of power source 10. It is contemplated that power source load sensor 84 may be a throttle pedal position sensor or switch. Alternatively, power source load sensor 84 may be any other type of known sensor (e.g., a speed sensor) capable of detecting power source load indicative of an idle condition.

Controller 66 may embody a single microprocessor or multiple microprocessors that include a means for controlling the operation of exhaust treatment system 12. Numerous commercially available microprocessors can be configured to perform the functions of controller 66. It should be appreciated that controller 66 could readily embody a general machine microprocessor capable of controlling numerous machine functions, an engine microprocessor, or a transmission microprocessor. Controller 66 may include a memory, a secondary storage device, a processor, and any other components for running an application. Various other circuits may be associated with controller 66, such as power supply circuitry, signal conditioning circuitry, solenoid driver circuitry, and other types of circuitry.

One or more electronic data maps 88, stored in the memory of controller 66, may relate particulate filter load, exhaust flow temperature, and power source load to an exhaust flow range in order to determine when regulation of regeneration system 16 is needed. Each of data maps 88 may be a collection of data in the form of tables, graphs, and/or equations that may be accessed by controller 66 in order to help controller 66 regulate operation of regeneration system 16. Empirical data may be developed and applied to data maps 88 to optimize performance of power source 10 based on characteristics of power source 10 and engine treatment system 12.

Active regeneration may be needed when exhaust flow is within an exhaust flow range defining a specific exhaust flow condition (e.g., an idle condition). In this narrow exhaust flow range, exhaust flow characteristics may be fairly constant and active regeneration control of burner may be designed specifically for the narrow range. Controller 66 may receive input from pressure sensors 68, 70, temperature sensors 76, 78, and power source load sensor 84 and responsively determine when exhaust flow is within the exhaust flow range, thereby indicating a need for active regeneration. When active regeneration is needed, controller 66 may reference data maps 88 to determine an adjustment to components (i.e., fuel injector 44, air valve 46, and ignition source 48) within regeneration system 16 required to provide combustion within burner chamber 42 to facilitate the regeneration event. In other words, controller 66 may regulate the amount of air and fuel supplied into burner chamber 42 by sending a command via a communication line 90 to fuel injector 44 and air valve 46. Controller 66 may also regulate the timing of combustion within burner 38 by sending a command via a communication line 92 to ignition source 48.

Figure 2:
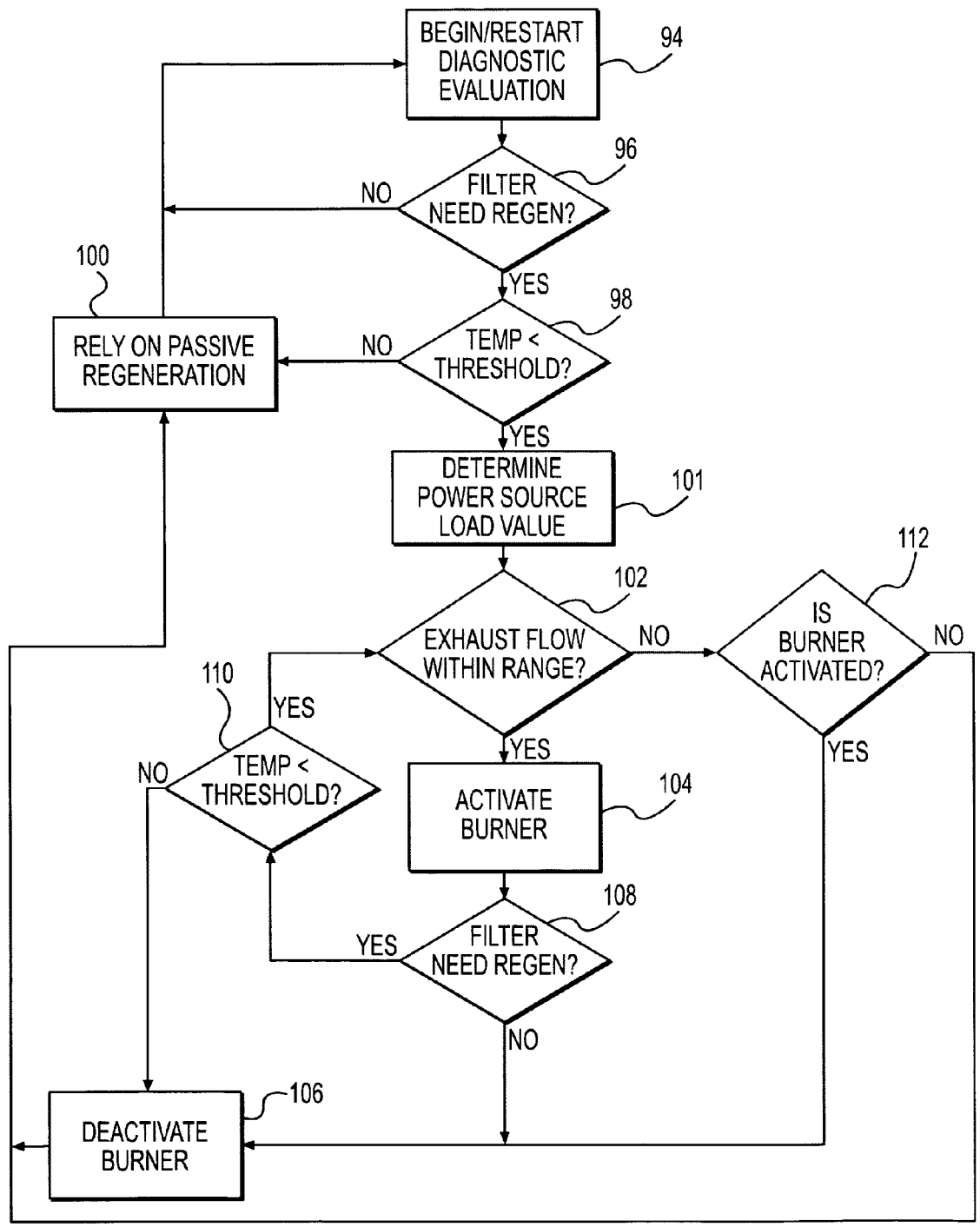
FIG. 2 is a control diagram illustrating an exemplary method of controlling the heat treatment system of FIG. 1.

FIG. 2 shows a control diagram implementing the exhaust treatment system. FIG. 2 will be discussed in detail in the following section.

Industrial Applicability

The disclosed exhaust treatment system may be applicable to any power source where a particulate filter regeneration event may affect performance of the power source. The disclosed exhaust treatment system may maintain consistent performance of the power source by utilizing system characteristics to determine when to switch between passive and active regeneration. The operation of exhaust treatment system 12 of power source 10 will now be described.

FIG. 2 illustrates a control diagram of an exemplary method for controlling exhaust treatment system 12 of power source 10. During a combustion process, power source 10 may intake an air and fuel mixture from fuel supply 26 and air supply 28, combust the mixture, and output an exhaust flow through exhaust manifold 34. The flow dynamics of exhaust exiting exhaust manifold 34 may vary dependent on engine load. After exiting exhaust manifold 34, the exhaust flow may pass downstream in heat exchange relationship with burner 38 before passing through particulate filter 14. During operation of power source 10, controller 66 may begin a diagnostic process of determining when particulate filter 14 is in need of regeneration (Step 94).

Sensing when particulate filter 14 is in need of regeneration may be performed by the particulate filter load sensing device, for example, by first and second pressure sensors 68, 70. First pressure sensor 68 may sense a first pressure value upstream of particulate filter 14, and second pressure sensor 70 may sense a second pressure value downstream of particulate filter 14. First and second pressure sensors 68, 70 may then forward the sensed pressure values to controller 66. Upon receipt of the sensed pressure values, controller 66 may determine a pressure difference across particulate filter 14. The determined pressure difference may be indicative of an amount of particulate matter within particulate filter 14. Controller 66 may access data maps 88 to determine when the amount of particulate matter within particulate filter 14 is above or below a particulate matter load threshold value (Step 96).

When controller 66 determines that the amount of particulate matter within particulate filter 14 is above the particulate matter load threshold value, controller may classify that particulate filter 14 is in need of regeneration. In contrast, when the amount of particulate matter within particulate filter 14 is below the particulate matter load threshold value, controller may classify that particulate filter 14 is not in need of regeneration. It is contemplated that the particulate matter load threshold value may vary dependent on characteristics of power source 10 and exhaust treatment system 12. For example, the particulate matter load threshold value may vary dependent on engine size, power level, or any other characteristic that may affect the need to regenerate particulate filter 14.

When particulate filter 14 is in need of regeneration, exhaust temperature may be sensed, for example, by first and second temperature sensors 76, 78. First and second temperature sensors 76, 78 may sense exhaust flow temperatures and forward the sensed temperature values to controller 66. Upon receipt of the sensed temperature pressure values, controller 66 may access data maps 88 to determine when the exhaust flow temperature is above a temperature threshold value (Step 98). When the exhaust flow temperature is above a temperature threshold value, passive regeneration may be sufficient to regenerate particulate filter 14 (Step 100). In contrast, when the sensed exhaust flow temperatures are below the temperature threshold value, active regeneration of particulate filter 14 may be required. It is contemplated that the temperature threshold value may be a combustion temperature sufficient to cause particulate matter to burn away with or without catalytic assistance.

When controller 66 determines that active regeneration may be needed (via Steps 96 and 98), power source load sensor 84 may be utilized to sense a power source load value. The power source load value sensed from power source load sensor 84 may be forwarded to controller 66 (Step 101), and controller 66 may access data maps 88 to determine when the power source load value is indicative of the exhaust flow being within an exhaust flow range defining a specific exhaust flow condition (e.g., an idle condition) (Step 102). For example, when the power source load value is below a power source load threshold value, controller 66 may indicate that the exhaust flow is within the exhaust flow range. Further, when the power source load is above a power source load threshold value, controller 66 may indicate that the exhaust flow is outside the exhaust flow range. It is contemplated that when the exhaust flow is determined to be within the exhaust flow range (e.g., during low duty cycles, such as idling) controller 66 may initiate an active regeneration strategy, for example by activating burner 38 (Step 104). In contrast, when the exhaust flow is outside the exhaust flow range (e.g., during normal or high duty cycles), controller 66 may not activate burner 38 and rely instead upon passive regeneration.

Controller 66 may require satisfaction of one or more conditions before activating burner 38 (Step 104), even when the exhaust flow is within the exhaust flow range (Step 102). Satisfaction of the one or more conditions may increase efficiency of regeneration system 16 by predicting when the exhaust flow will remain within the exhaust flow range (i.e., maintaining similar exhaust flow dynamics) for an extended period of time. An exemplary condition may be include sensing that the exhaust flow remains within the exhaust flow range for a predetermined time period. Therefore, completion of a predetermined time period may be indicative that regeneration device 16 may operate without suddenly be required to deactivate. A further exemplary condition may include a trigger event that is indicative that the exhaust flow will remain within the exhaust flow range for an extended period of time. For example, the trigger event may include sensing that an operator is not positioned on the machine (e.g., via a seat sensor) which may also be indicative that the exhaust flow is not likely to undergo a change in exhaust flow dynamics for an extended period of time.

When it is determined that the exhaust flow is within the exhaust flow range at Step 102, controller 66 may reference data maps 88 to determine an adjustment to components (i.e., fuel injector 44, air valve 46, and ignition source 48) within regeneration system 16 required to provide combustion within burner chamber 42 that facilitates the regeneration event. In other words, controller 66 may regulate the amount of fuel and air supplied into burner chamber 42 by sending a command via communication line 90 to fuel injector 44 and air valve 46. Controller 66 may also regulate the timing of combustion within burner 38 by sending a command via communication line 92 to ignition source 48. However, since active regeneration may only be initiated during the specific exhaust flow conditions, the controller and associated regeneration components may be simplified in comparison to other systems that provide active regeneration under widely varying exhaust flow conditions.

When controller 66 determines that the exhaust flow is outside the exhaust flow range, controller 66 may determine that burner 38 is already activated (Step 112). When the exhaust flow is outside the exhaust flow range and burner 38 is already activated, controller 66 may deactivate burner 38 (Step 106). When controller 66 determines that the exhaust flow is outside the exhaust flow range and burner 38 is not already activated, then controller 66 may maintain burner 38 in a deactivated condition and rely instead upon passive regeneration (Step 100).

While burner 38 is activated, the particulate filter load sensing device (i.e., first and second pressure sensors 68, 70) may continuously sense information indicative of whether particulate filter 14 is in need of regeneration (Step 108). When controller 66 receives a second particulate load value that is below the particulate load threshold value that is indicative that particulate filter 14 is not in need of regeneration, controller 66 may deactivate burner 38 (Step 106). In contrast, when the second particulate load value is above the particulate matter load threshold value that is indicative that particulate filter 14 is still in need of regeneration, controller 66 may maintain active regeneration.

When the second particulate matter load value indicates that particulate filter 14 is still in need of regeneration, controller 66 may determine when the temperature of the exhaust flow is sufficient to rely upon passive regeneration. In other words, when controller 66 determines that the temperature of the exhaust flow is above the temperature threshold value, controller 66 may deactivate burner 38 and rely upon passive regeneration (Step 100).

It is also contemplated that controller 66 may deactivate burner 38 based on duration, for example, after a lapse of a period of time since burner 38 was activated. The period of time may be substantially proportional to the amount of particulate matter within particulate filter 14. In other words, when deactivation of burner 38 is based on time, a particulate filter that is heavily loaded may be regenerated for a longer period of time than a particulate filter that is lightly loaded. Controller 66 may access data maps 88 to determine the period of time required for active regeneration. Once the period of time has expired, controller 66 may deactivate burner 38.

By way of example, exhaust treatment system 12 may be implemented on a machine having a relatively small power source that is often operated within a narrow exhaust flow condition (e.g., an idle condition). An operator (e.g., a painter) may use a mobile platform machine (not shown) to position and elevate himself to various points around an exterior of a building. The operator may drive the machine from point A to point B, and during the transition from point A to point B, machine may generate a high engine load that is indicative of a first exhaust flow condition. Then the operator may decide to remain idle at point B and paint a large portion of the building, whereby power source 10 may generate a low engine load that is indicative of a second exhaust flow condition (i.e., an idle condition). Exhaust treatment system 12, utilizing controller system 18 may recognize the difference in exhaust flow conditions and only activate regeneration system 16 under the narrow range defined by the second exhaust flow condition when the machine experiences a low engine load (e.g., an idle condition).

Because controller 66 may distinguish between various ranges of exhaust flow conditions (e.g., an idle condition as compared to medium or high engine loads), exhaust treatment system 12 may be simplified to only implement active regeneration under those specific exhaust flow conditions and rely upon passive regeneration under all conditions outside of the specified exhaust flow conditions. Identification of a narrow range of exhaust flow conditions may allow exhaust treatment system 12 to utilize simplified components and simplified control and achieve performance benefits of active regeneration at a more economic cost than exhaust treatment systems that rely upon active regeneration over a wider range of exhaust flow conditions.

It will be apparent to those skilled in the art that various modifications and variations can be made to the disclosed exhaust treatment control system without departing from the scope of the disclosure. Other embodiments of the exhaust treatment system will be apparent to those skilled in the art from consideration of the specification and practice of the exhaust treatment system disclosed herein. It is intended that the specification and examples be considered as exemplary only, with a true scope of the disclosure being indicated by the following claims and their equivalents.

What is claimed is:

1. An exhaust treatment system associated with a power source, comprising:
   a filter located to remove particulate matter from an exhaust flow of the power source;
   a heat source located to elevate the temperature of the exhaust flow;
   a first sensor configured to sense a particulate matter load value associated with the filter;
   a second sensor configured to sense a power source load value; and
   a controller in communication with the heat source, the first sensor, and the second sensor, the controller being configured to:
   receive the particulate matter load value;
   receive the power source load value;
   predict when the power source will maintain an idle condition for a predetermined time period; and
   restrict initiation of active regeneration of the filter to exhaust flow conditions in which the particulate matter load value is above a particulate matter load threshold value and the power source load value is indicative of the idle condition based on the prediction.

2. The system of claim 1, wherein the heat source is a burner.

3. The system of claim 1, wherein the second sensor is a throttle pedal position sensor.

4. The system of claim 1, wherein the first sensor is configured to sense a pressure difference across the filter.

5. The system of claim 1, wherein the controller is further configured to deactivate the heat source when the particulate matter load value drops below the particulate matter load threshold value.

6. The system of claim 1, wherein the controller is further configured to deactivate the heat source when the power source load value exceeds a power source load threshold value that is indicative of the exhaust flow being outside an exhaust flow range.

7. The system of claim 1, further including a third sensor configured to sense a temperature value of the exhaust flow, wherein the controller is further configured to receive the temperature value from the third sensor and regulate operation of the heat source based on the temperature value.

8. The system of claim 7, wherein the controller is further configured to deactivate the heat source when the temperature value exceeds a temperature threshold value.

9. The system of claim 7, wherein the controller is further configured to regulate operation of the heat source by commanding the heat source to combust an amount of air and fuel based on a comparison of the sensed particulate matter load value, the temperature value, and the power source load value with a data map associated with the controller.

10. A method of operating a power source, comprising:
    combusting an air and fuel mixture to generate power and an exhaust flow;
    collecting particulate matter from the exhaust flow with a filter;
    sensing a particulate matter load value indicative of an amount of collected particulate matter;
    sensing a power source load value;
    predicting when the power source will maintain an idle condition for a predetermined time period; and
    restricting initiation of active regeneration of the filter to the idle condition based on the prediction by heating the exhaust flow to burn away the collected particulate matter when the particulate matter load value exceeds a particulate matter load threshold value and the power source load value is below a power source load threshold value that is indicative of the exhaust flow being within an exhaust flow range.

11. The method of claim 10, further including ceasing to heat the exhaust flow when the particulate matter load value is below the particulate matter load threshold value.

12. The method of claim 10, further including ceasing to heat the exhaust flow when the power source load value exceeds the power source load threshold value that is indicative of the exhaust flow being outside the exhaust flow range.

13. The method of claim 10, further comprising sensing that the exhaust flow is indicative of the idle condition for a predetermined time period and restricting active regeneration based on completion of the time period.

14. The method of claim 10, further including sensing a temperature value of the exhaust flow, wherein heating is based also on the temperature value.

15. The method of claim 14, further including ceasing to heat the exhaust flow when the temperature value exceeds a temperature threshold value.

16. The method of claim 14, wherein heating includes combusting an amount of air and fuel based on a comparison of the sensed particulate matter load value, the temperature value, and the power source power source load value with a data map.

17. An engine system, comprising:
    an engine configured to combust an air and fuel mixture to generate power and exhaust flow;

an exhaust circuit configured to direct the exhaust flow from the engine to the atmosphere;
a filter located within the exhaust circuit to remove particulate matter from the exhaust flow;
a burner located downstream of the engine to selectively elevate the temperature of the exhaust flow;
a particulate matter load sensor configured to sense a particulate matter load value associated with the filter;
a temperature sensor configured to sense a temperature value of the exhaust flow;
a power source load sensor configured to sense a power source load value indicative of an idle condition; and
a controller in communication with the burner, the particulate matter load sensor, the temperature sensor, and the power source load sensor, the controller being configured to:
receive the particulate matter load value;
receive the temperature value;
receive the power source load value;
predict when the power source will maintain the idle condition for a predetermined time period; and
restrict initiation of active regeneration of the filter to the idle condition based on the prediction by commanding the burner to combust an amount of air and fuel based on a comparison of the sensed particulate matter load value, the temperature value, and the power source load value with a data map associated with the controller.

18. The system of claim 17, wherein the controller is further configured to activate the burner when the particulate matter load value is above a particulate matter load threshold value, the temperature value is below a temperature threshold value, the power source load value is below a power source load threshold value that is indicative of the exhaust flow being within an exhaust flow range.

19. The system of claim 18, wherein the controller is further configured to deactivate the burner when the particulate matter load value is below the particulate matter load threshold value, the temperature value is above the temperature threshold value, or the power source load value is above the power source load threshold value that is indicative of the exhaust flow being outside the exhaust flow range.

* * * * *